United States Patent
Shinohira et al.

(10) Patent No.: US 7,462,959 B2
(45) Date of Patent: Dec. 9, 2008

(54) LINEAR MOTOR AND STAGE DEVICE USING THE LINEAR MOTOR

(75) Inventors: Daisuke Shinohira, Nerima-ku (JP); Dotaro Usui, Kawasaki (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 150 days.

(21) Appl. No.: 11/599,513

(22) Filed: Nov. 15, 2006

(65) Prior Publication Data

US 2007/0056958 A1    Mar. 15, 2007

Related U.S. Application Data (63) Continuation of application No. PCT/JP2005/011938, filed on Jun. 29, 2005.

(30) Foreign Application Priority Data

Jul. 12, 2004  (JP)  ............................. 2004-204744

(51) Int. Cl.
*H20K 41/02*  (2006.01)
(52) U.S. Cl. .......................................... 310/12; 310/15
(58) Field of Classification Search ................ 310/12, 310/15
See application file for complete search history.

(56) References Cited

U.S. PATENT DOCUMENTS

| | | | |
|---|---|---|---|
| 6,590,355 B1 * | 7/2003 | Kikuchi et al. | 318/135 |
| 6,731,029 B2 * | 5/2004 | Shikayama et al. | 310/58 |
| 6,847,132 B2 * | 1/2005 | Ukaji | 310/12 |
| 6,903,468 B2 * | 6/2005 | Korenaga | 310/12 |
| 6,946,755 B2 * | 9/2005 | Tamai et al. | 310/12 |
| 2003/0141769 A1 | 7/2003 | Kubo | |

FOREIGN PATENT DOCUMENTS

| | | |
|---|---|---|
| JP | 5-9183 | 5/1993 |
| JP | 05-191961 | 7/1993 |
| JP | 6-62786 | 9/1994 |
| JP | DE 19604643 | 8/1997 |
| JP | 10-323012 | 12/1998 |
| JP | 11-243677 | 9/1999 |
| JP | 2000-050613 | 2/2000 |
| JP | 2000-333438 | 11/2000 |
| JP | 2001-275335 | 10/2001 |
| JP | 2001-327152 | 11/2001 |
| JP | 2002-010616 | 1/2002 |
| JP | 2002-010618 | 1/2002 |
| JP | 2002-165433 | 6/2002 |

(Continued)

*Primary Examiner*—Darren Schuberg
*Assistant Examiner*—Iraj Mohandesi
(74) *Attorney, Agent, or Firm*—Squire, Sanders & Dempsey L.L.P.

(57) ABSTRACT

A linear motor can include a coil part having a plurality of coils forming a coil line; a magnet yoke part having a plurality of permanent magnets facing the coil line; and a coil cooling part configured to cool the coil part. The coil cooling part can include a cooling panel having a heat conductive element, the heat conductive element transferring heat of the coil part to an outside; and a heat radiation part connected to the cooling panel, the heat radiation part being configured to radiate the heat transferred from the heat conductive element to the outside.

18 Claims, 10 Drawing Sheets

FOREIGN PATENT DOCUMENTS

| | | | |
|---|---|---|---|
| JP | 2002-171742 | * | 6/2002 |
| JP | 2002-238238 | | 8/2002 |
| JP | 2003-061331 | | 2/2003 |
| JP | 2003-224961 | | 8/2003 |
| JP | 2005-137105 | | 5/2005 |

* cited by examiner

LINEAR MOTOR AND STAGE DEVICE USING THE LINEAR MOTOR

CROSS-REFERENCE TO RELATED APPLICATION

This application is a U.S. continuation application filed under 35 USC 111(a) claiming benefit under 35 USC 120 and 365(c) of PCT application JP05/011938, filed Jun. 29, 2005, which claims priority to Application Ser. No. 2004-204744, filed in Japan on Jul. 12, 2004. The foregoing applications are hereby incorporated herein by reference.

BACKGROUND OF THE INVENTION

1. Field of the Invention

The present invention generally relates to linear motors and stage devices using the linear motors. More particularly, the present invention relates to a linear motor wherein heat from a coil is efficiently transferred and a stage device using the linear motor.

2. Description of the Related Art

In minute positioning devices used for semiconductor manufacturing devices, liquid crystal manufacturing devices, or the like, a linear motor is used as a driving part configured to drive a stage where a processed subject such as a substrate is mounted. Both ends of the stage are driven in translation by a pair of linear motors.

Such a liner motor includes a coil part and a magnet yoke part. Plural coils are arranged in a single line in the coil part. Plural permanent magnets are arranged in a single line state so as to face the coil line in the magnet yoke part. The coil part is energized so that an electromagnetic force is generated and a thrust force (driving force) is generated to the permanent magnet.

As a structure of the linear motor, there is a moving coil type and a moving magnet type. In the moving coil type, the magnet yoke part works as a fixing side and the coil part works as a movable side. In the moving magnet type, the coil part works as a fixing side and the magnet yoke part works as a movable side.

In either type, if temperature is increased due to heat from the coil, the resistance value of the coil itself is increased so that a driving current is reduced. In the linear motor, since the thrust force is proportional to the driving current, the thrust force is decreased as the driving current is decreased.

In addition, heat generated from the coil influences the external environment. Because of this, a cooling part is configured to cool the coil part in the linear motor in order to reduce the influence due to heat from the coil.

In the meantime, a linear motor having a structure where two coil lines face two magnet lines is suggested. A configuration of each of the coils is not a flat shape but a rectangular shape not having one side where both sides of a coil wound in a rectangular shape are bent at 90 degrees. In addition, arrangement directions of coils neighboring each other of the coil line differ by 180 degrees and bending parts of both sides of the coils are overlapped in a moving direction, so that torque change is prevented.

However, in the above-mentioned linear motor, the directions of the neighboring coils formed in a rectangular shape not having one side by bending both sides at 90 degrees differ by 180 degrees so that the bending parts of both sides of the coils are overlapped. Hence, while lack of torque is solved so that minute moving control is realized, it is not possible to insert the panel shape heat pipe in the gap between the coil lines bending in a crank shape.

Because of this, in the above-mentioned linear motor, a cooling flow path is provided so as to circulate a coolant to the coil part and a pump or the like is provided so as to supply the coolant to the cooling flow path. In addition, a sealing structure for preventing outflow of the coolant is necessary. Hence, the structure may be maximized and complex so that manufacturing cost may be increased.

SUMMARY OF THE INVENTION

Accordingly, embodiments of the present invention may provide a novel and useful linear motor and stage device using the linear motor in which one or more of the problems described above are eliminated.

More specifically, the embodiments of the present invention can provide a linear motor and stage device using the linear motor whereby cooling efficiency of a coil is improved.

The embodiments of the present invention can also provide a linear motor including a coil part having a plurality of coils forming a coil line; a magnet yoke part having a plurality of permanent magnets facing the coil line; and a coil cooling part configured to cool the coil part. The coil cooling part can include a cooling panel having a heat conductive element, the heat conductive element transferring heat of the coil part to an outside; and a heat radiation part connected to the cooling panel, the heat radiation part being configured to radiate the heat transferred from the heat conductive element to the outside.

The embodiments of the present invention can also provide a stage device including a linear motor; a slider driven by the linear motor; a stage configured to move with the slider; and a guide part configured to guide the moving of the stage. The linear motor can include a coil part having a plurality of coil forming a coil line; a magnet yoke part having a plurality of permanent magnets facing the coil line; and a coil cooling part configured to cool the coil part. The coil cooling part can include a cooling panel having a heat conductive element, the heat conductive element transferring heat of the coil part to an outside; and a heat radiation part connected to the cooling panel, the heat radiation part being configured to radiate the heat from the heat conductive element to the outside.

According to the above-mentioned linear motor, the coil cooling part includes the cooling panel having the heat conductive element, the heat conductive element transferring heat of the coil part to the outside; and the heat radiation part connected to the cooling panel, the heat radiation part being configured to radiate the heat transferred from the heat conductive element to the outside. Hence, heat of the coil part is efficiently radiated outside in a simple structure so that temperature of the coil part is prevented from being increased. As a result of this, it is possible to prevent decreasing a driving force. Even if neighboring coils are alternately overlapped, it is possible to sufficiently cool the coil part.

Therefore, in the above-mentioned stage device, even if the coil has a complex configuration in order to solve the lack of torque problem, it is possible to efficiently cool the coil part from a periphery of the coil part. Hence, it is possible to increase torque and realize minute high speed control so that it is possible to prevent decrease of a thrust force due to cooling of the coil part.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIG. 1 through FIG. 14, of embodiments of the present invention.

First Example of the Present Invention

Figure 1:
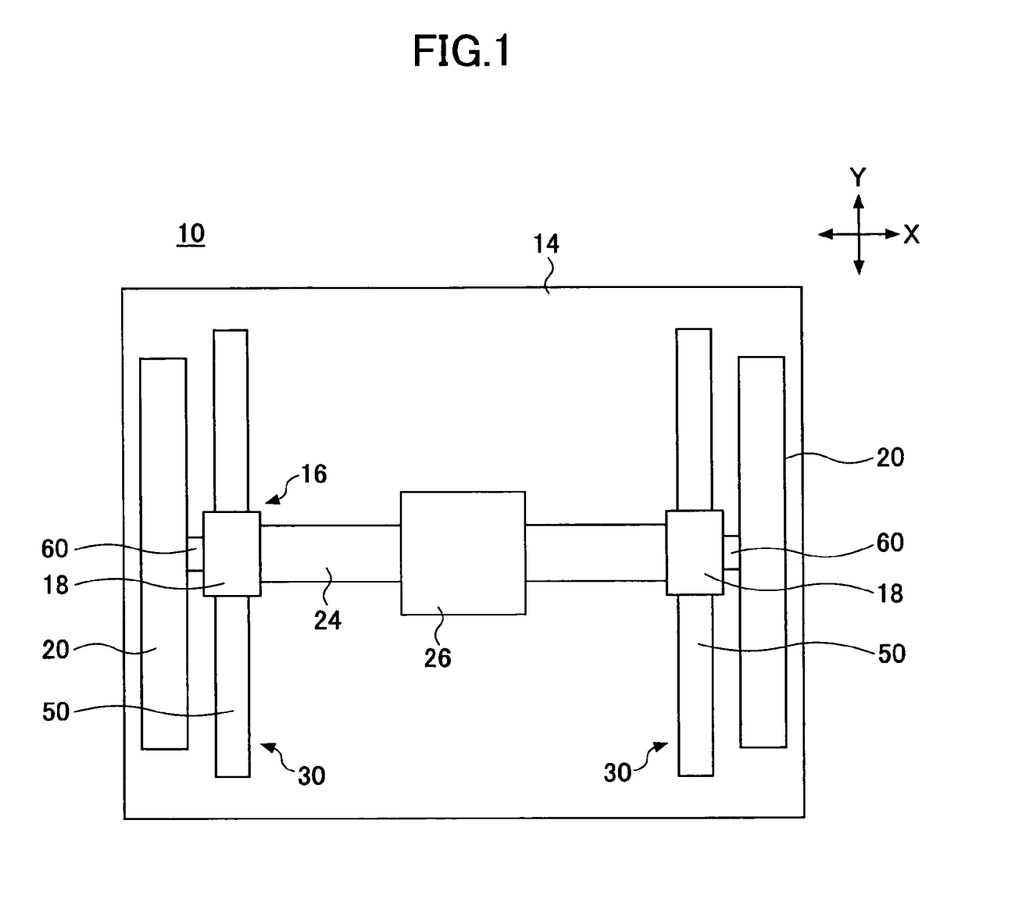
FIG. 1 is a plan view of a stage device where a linear motor of a first example of the present invention is applied.

FIG. 1 is a plan view of a stage device where a linear motor of a first example of the present invention is applied. As shown in FIG. 1, a stage device 10 is a XY stage. The stage device 10 includes a base 14, a movable part 16, and a pair of linear motors 20. The base 14 is fixed to a concrete base (not shown). The movable part 16 is moved on the base 14. The linear motors 20 drive both end parts of the movable part 16 in directions indicated by arrows Y.

The movable part 16 includes sliders 18, a Y slider 24, and an X slider 26. The sliders 18 are driven by the linear motors 20. The Y slider 24 extends in directions indicated by arrows X perpendicular to a moving direction so as to connect the sliders 18. The X slider 26 moves on the Y slider 24 in the directions indicated by the arrows X.

The sliders 18 are guided by guide rails 50 of guide parts 30 extending in the directions indicated by the arrows Y and slidably supported in the directions indicated by the arrows Y. Coil parts 60 of the linear motors 20 are attached to the sliders 18.

While the sliders 18 provided at left and right ends are guided by the guide parts 30, the movable part 16 is driven in the directions indicated by the arrows Y by the driving force of the linear motor 20. Therefore, in the movable part 16, the sliders 18 provided at both ends are simultaneously driven by the driving force of the corresponding linear motors 20 so that the sliders 18 are translated (undergo linear movement).

Figure 2:
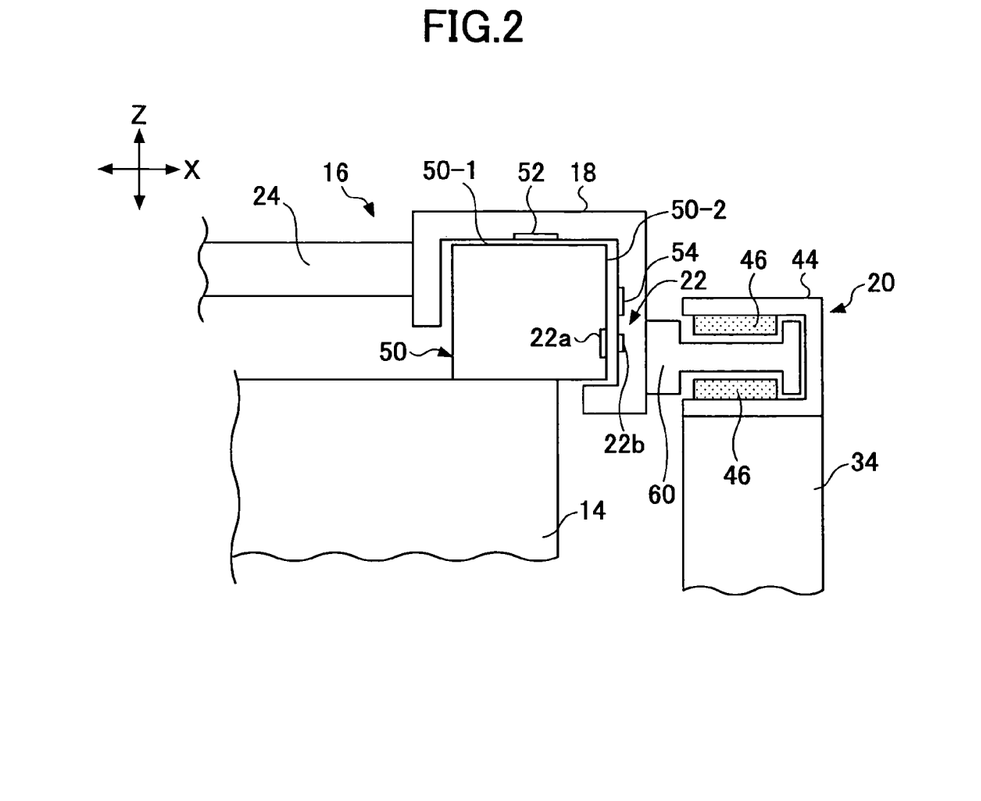
FIG. 2 is an enlarged front view of structures of a linear motor 20 and a guide part 30.
Figure 3:
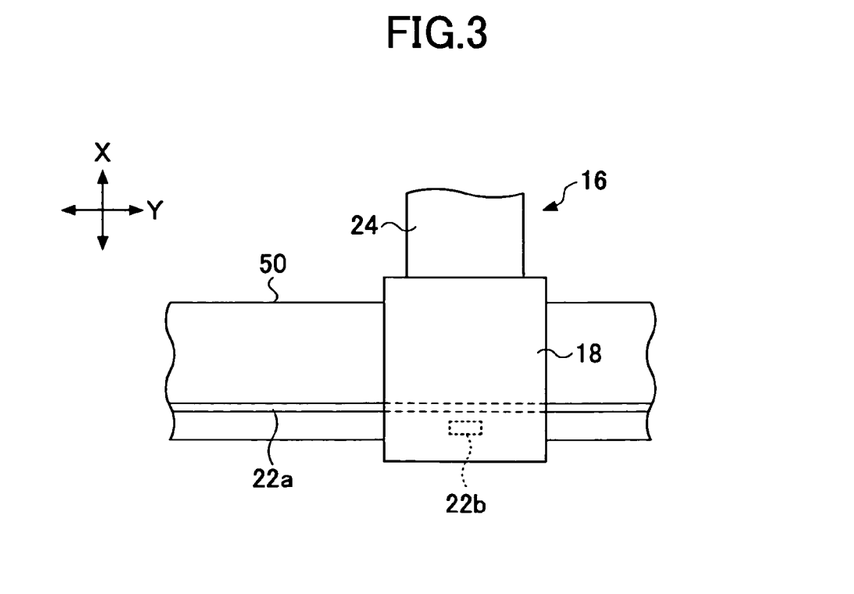
FIG. 3 is an enlarged plan view of the structures of the linear motor 20 and the guide part 30.

Here, structures of the linear motor 20 and the guide parts 30 are discussed with reference to FIG. 2 and FIG. 3. FIG. 2 is an enlarged front view of structures of the linear motor 20 and the guide part 30. FIG. 3 is an enlarged plan view of the structures of the linear motor 20 and the guide part 30.

Figure 4:
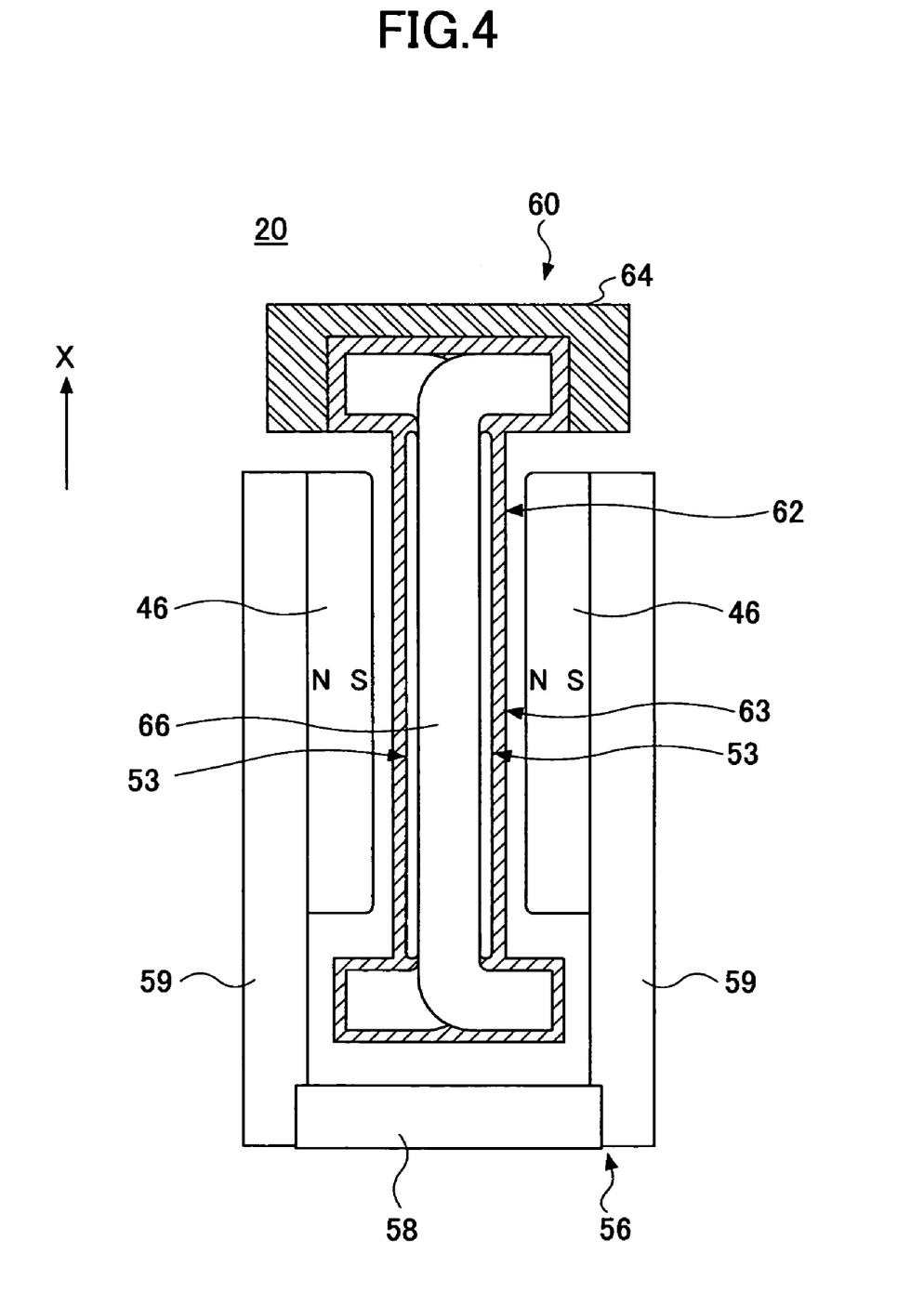
FIG. 4 is a vertical cross-sectional view showing the structure of the liner motor 20.

As shown in FIG. 2 and FIG. 3, the linear motor 20 includes the coil part 60 and a magnet unit 56 (see FIG. 4). In the magnet unit 56, permanent magnets 46 are arranged at constant intervals. The permanent magnets 46 are fixed to an internal side surface of a rectangular U-shaped yoke 44 configuration. The yoke 44 is supported by an upper end of a motor supporting part 34. A coil 66 (see FIG. 11) of the coil part 60 is arranged so as to face the permanent magnets 46. The coil 66 generates a driving force, namely a thrust force in the directions indicated by the arrows Y with the permanent magnets 46 by applying a driving voltage.

Therefore, a Lorentz force to the permanent magnet 46 is generated from the coil part 60 so that the linear motor 20 applies a driving force in the directions indicated by the arrows Y to the slider 18. The linear motor 20 can generate the driving force so that the slider 18 can run at a constant speed in the directions indicated by the arrows Y by controlling a voltage applied to the coil 66 of the coil part 60.

The movable part 16 has the slider 18 surrounding four sides of the guide rail 50 extending in the directions indicated by the arrows Y. The slider 18 includes a first static pressure air bearing 52 and a second static pressure air bearing 54. The first static pressure air bearing 52 jets compressed air between the slider 18 and an upper surface 50-1 of the guide rail 50 so that the slider 18 is supported vertically on a cushion of air. The second static pressure air bearing 54 jets compressed air between the slider 18 and a right side surface 50-2 of the guide rail 50 so that the movable part 16 is supported horizontally with a cushion of air.

The slider 18 includes a guide surface facing each surface of the guide rail 50 with a minute gap. Therefore, the compressed air jetted from the second static pressure air bearing 54 to the gap presses the guide surface of the slider 18 at a designated pressure. As a result of this, since the slider 18 is supported by a cushion of air in a minute gap with the guide rail 50, it is possible to make the slider 18 move in the directions indicated by the arrows Y without contacting the guide rail 50 so that there is almost no friction.

A linear scale 22 configured to detect a moving position of the slider 18 includes a position detecting plate 22a and a sensor 22b. The position detecting plate 22a is located on a right side surface 50-2 of the guide rail 50 so as to extend in the directions indicated by the arrows Y. The sensor 22b detects the number of slits of the position detecting plate 22a. Since the sensor 22b is attached to the slider 18, the moving amount is output as the number of pulses corresponding to the number of the slits arranged in a single line at a designated interval as a detection signal.

Figure 5:
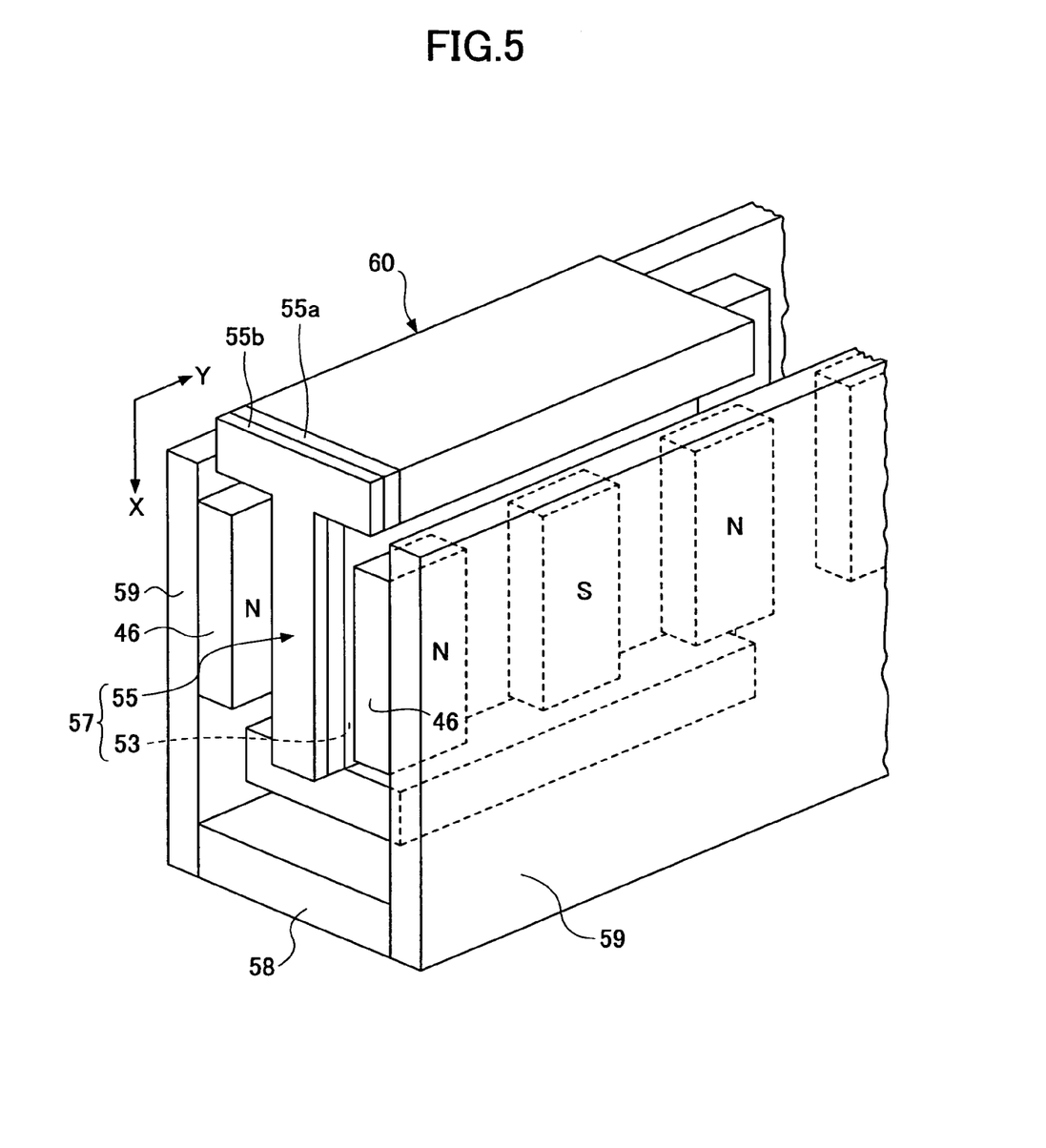
FIG. 5 is a perspective view showing the structure of the liner motor 20.

FIG. 4 is a vertical cross-sectional view showing the structure of the liner motor 20. FIG. 5 is a perspective view showing the structure of the liner motor 20.

As shown in FIG. 4 and FIG. 5, the coil part 60 is formed by unifying two lines of the coils 66 by a mold 63. The coil part 60 is provided so as to extend in the moving directions, namely the directions indicated by the arrows Y. In addition, cooling panels 53 are attached to left and right side surfaces of the coil part 60. A coil holder 64 supports an upper part of the coil part 60. Since surfaces of the coil 66 and the cooling panel 53 are covered by the mold 63, the exterior of the cooling panel 53 cannot be seen.

The magnet unit 56 has a base yoke 58 and side yokes 59 are combined in a U-shaped structure. The magnet 46 is attached to internal walls of the side yokes 59. Therefore, the magnets 46 fixed to insides of the side yokes 59 standing at both sides of the base yoke 58 face both sides of the coil 66 received inside the mold 63. In addition, since the cooling-panels 53 are formed in thin plate shapes, the cooling panels 53 are attached to both sides surfaces of the coil part 60 so that moving of the coil part 60 is not disturbed.

Figure 6:
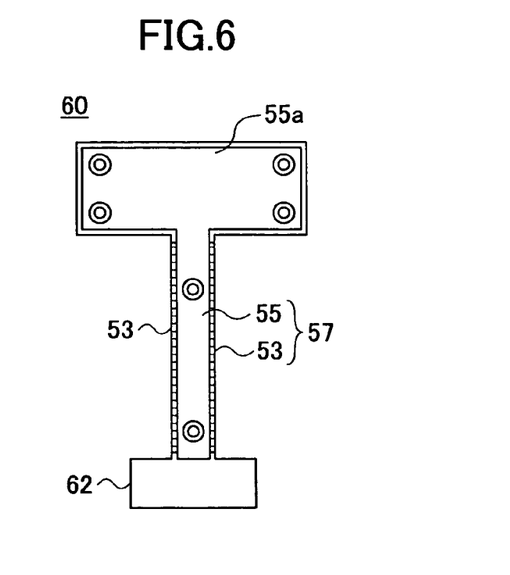
FIG. 6 is a front view of a coil part 60.
Figure 7:
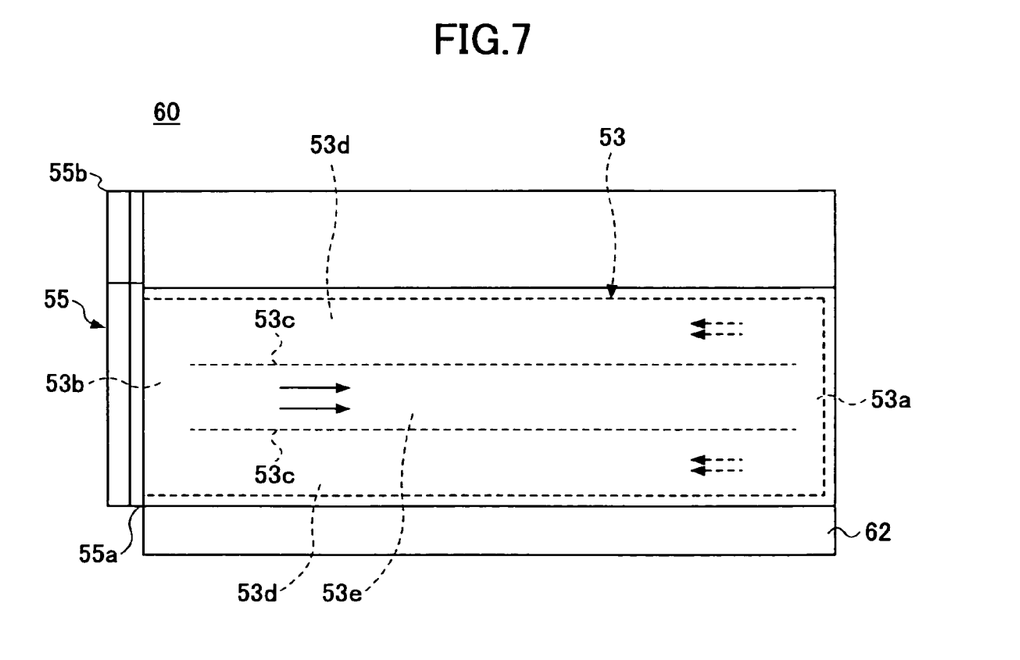
FIG. 7 is a side view of the coil part 60.
Figure 8:
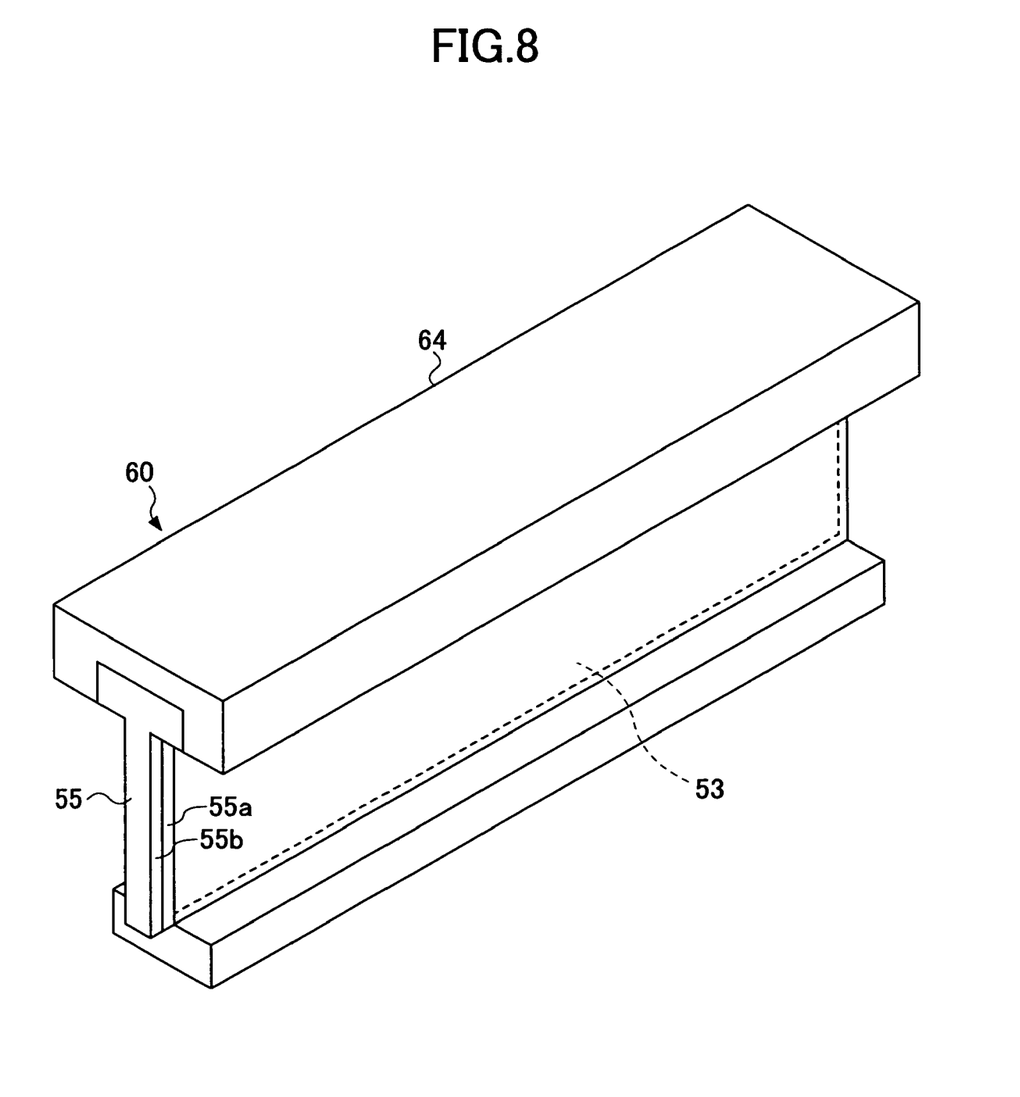
FIG. 8 is a perspective view of the coil part 60.

Here, the structure of the coil part 60 of the liner motor 20 is discussed with reference to FIG. 6 through FIG. 8. FIG. 6 is a front view of the coil part 60. FIG. 7 is a side view of the coil part 60. FIG. 8 is a perspective view of the coil part 60.

As shown in FIG. 6 through FIG. 8, in the coil part 60, the cooling panels 53, indicated by dotted lines in FIG. 7 and FIG. 8, are provided inside the mold 63. A heat radiation part 55 is attached to an end part of the coil part 60. The cooling panels 53 and the heat radiation part 55 form a coil cooling part 57. The cooling panels 53 are provided at left and right side surfaces of the coil part 60 and received inside the mold 63.

Since the cooling panels 53 can make a contact area with the coil 66 large, cooling capability can be improved. In addition, the cooling panel 53 may be provided at a single side of the coil part 60 as corresponding to a heating amount of the coil 66 or may be provided at both sides of the coil part 60.

The cooling panel 53 is formed by flat, thin plate-shaped heat pipes. A heat conductive element using the principle of a heat pipe is provided in an inside space of the cooling panel 53. Since there is no need to provide tubes for circulating a coolant or a heat exchanger in the cooling panel 53, the structure of the cooling panel 53 is compact. As shown in FIG. 7, a right end of the cooling panel 53 is a heat input side 53a and a left end of the cooling panel 53 is a heat radiation side 53b. Because of this, since heat of the coil 66 is transferred from the right end to the left end of the cooling panel 53, heat inside the coil 66 is moved to the right end side so as to be transferred to the heat input side 53a of the cooling panel 53.

A heat radiation part 55 is attached to an end part of the coil part 60 so as to come in contact with a heat radiation side of the cooling panel 53. The heat radiation part 55 includes a first heat sink 55a and a second heat sink 55b. The first heat sink 55a is fixed to the end part of the coil part 60. The second heat sink 55b is detachably fixed to an end surface of the first heat sink 55a by a joining member such as a screw. The first and second heat sinks 55a and 55b have T-shaped configurations corresponding to a configuration of the end part of the coil part 60 whereby moving of the coil part 60 is not disturbed. In addition, in order to achieve a heat radiation effect, the first and second heat sinks 55a and 55b are made of metals having high coefficients of thermal conductivity and good processing abilities, such as copper (Cu) or aluminum (Al) alloy. Furthermore, the first and second heat sinks 55a and 55b may have block-shaped configurations. Plural heat radiation fins may be provided at the first and second heat sinks 55a and 55b so that heat radiation areas can be expanded.

Figure 9:
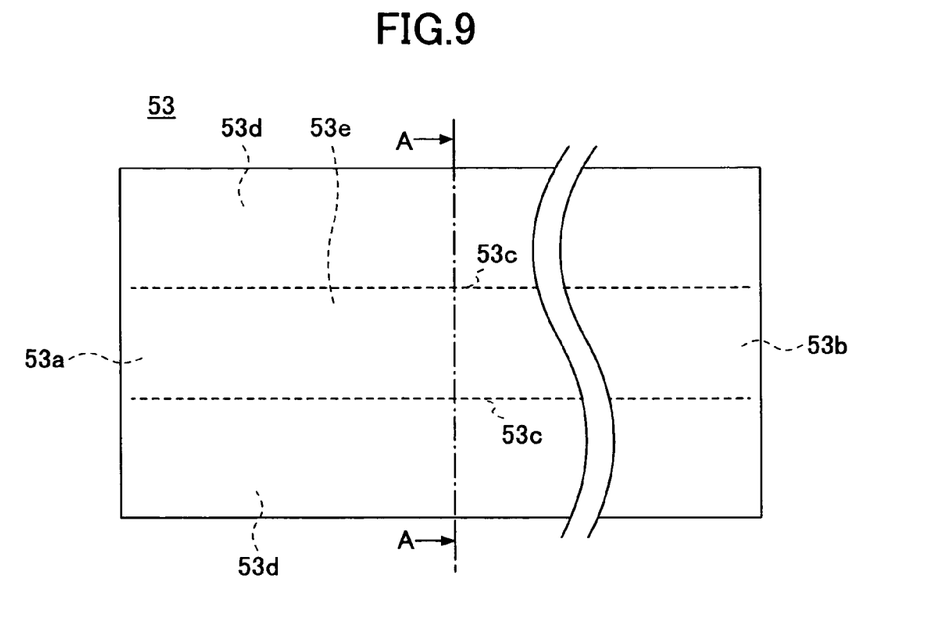
FIG. 9 is a front view showing a structure of a cooling panel 53.
Figure 10:
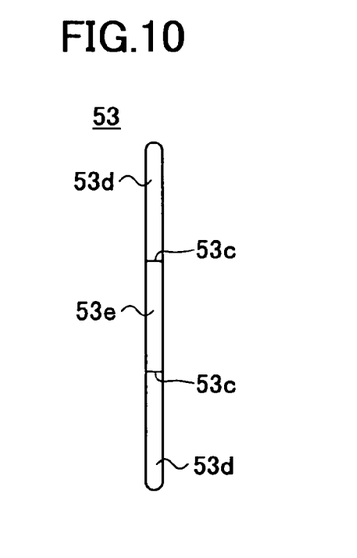
FIG. 10 is a vertical cross-sectional view taken along a line A-A in FIG. 9.

FIG. 9 is a front view showing a structure of the cooling panel 53. FIG. 10 is a vertical cross-sectional view taken along a line A-A in FIG. 9.

As shown in FIG. 9 and FIG. 10, a vacuum state is maintained inside of the cooling panel 53. Liquid such as pure water is supplied inside of the cooling panel 53. This liquid is vaporized by heat of the heat input side 53a and moves to the heat radiation side 53b so that heat of evaporation at the heat input side 53a is removed to be transferred to the heat radiation side 53b. Since the heat radiation side 53b is cooled by the first and second heat sinks 55a and 55b, vapor is returned to liquid at the heat radiation side 53b so that heat is radiated. The liquid aggregated at the heat radiation side 53b is returned to the heat input side 53a by capillary action.

The cooling panel 53 is made of metal having high heat conductivity such as copper (Cu) and formed in a flat plate shape. The cooling panel 53 has an inside space having three paths, namely a pair of vapor paths 53d and a reflux path 53e, defined by a pair of barriers 53c. Vapor moves from the heat input side 53a to the heat radiation side 53b via the vapor paths 53d. Liquid moves from the heat radiation side 53b to the heat input side 53a via the reflux path 53e.

The reflux path 53e is formed between a pair of the vapor paths 53d. The reflux path 53e and the vapor paths 53d are formed so as to extend in a horizontal direction. In addition, both ends of the reflux path 53e and the vapor paths 53d are in communication with each other so that vapor or liquid can flow between the reflux path 53e and the vapor paths 53d. Furthermore, since an extra fine wire wick (not shown) formed by winding copper wires is inserted in the reflux path 53e the reflux speed of liquid is accelerated by capillary action.

Thus, in the cooling panel 53, heat generated by the coil 66 can be efficiently transferred to the first and second heat sinks 55a and 55b by a principle of the heat pipe so that cooling is performed. Therefore, it is possible to prevent an increase of temperature of the coil 66.

Figure 11:
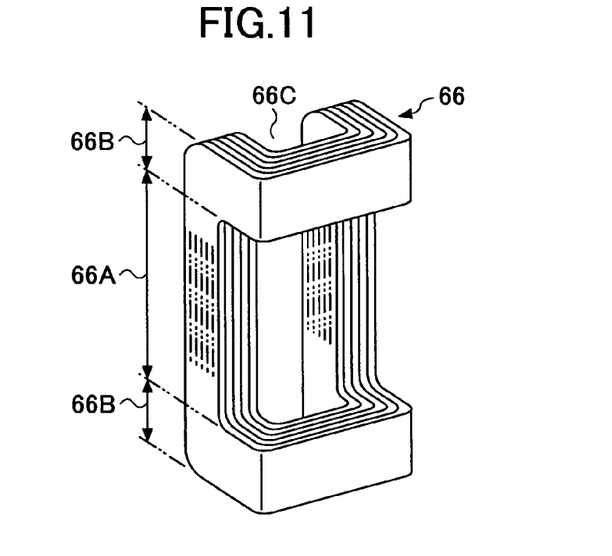
FIG. 11 is a perspective view showing a structure of a coil 66.
Figure 12:
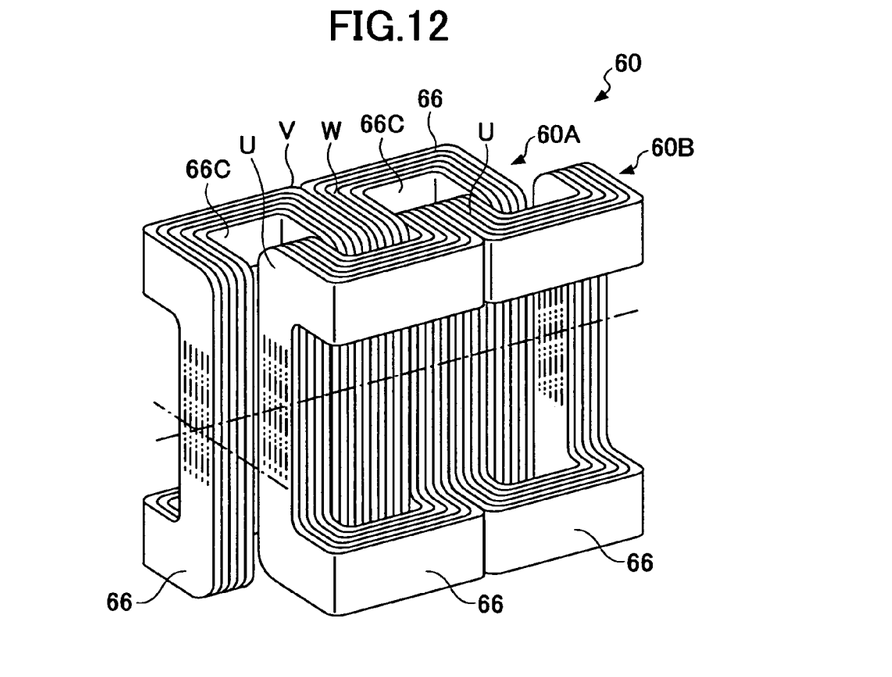
FIG. 12 is a perspective view showing a state where two lines of the coils are combined.

FIG. 11 is a perspective view showing a structure of the coil 66. FIG. 12 is a perspective view showing a state where two lines of the coils are combined.

As shown in FIG. 11 and FIG. 12, both side of the coil 66 are bent at approximately 90 degrees so that the coil 66 has a rectangular shape configuration not having one side. Arrangement directions of coils 66 in two coil lines 60A and 60B arranged in parallel in the moving directions, namely the direction indicated by the arrows X differ by 180 degrees. The coils 66 of the first coil line 60A and the coils 66 of the second coil line 60B are joined together so as to be engaged with each other. Since the above-discussed cooling panel 53 is attached to a linear part 66A of the coil 66, the coil 66 is cooled from a side surface of the coil 66.

The coil 66 has a so-called saddle structure where copper (Cu) wires are wound in a rectangular pattern and both ends are bent approximately 90 degrees. More specifically, the coil 66 includes the linear part 66A, a pair of bending parts 66B, and a concave part 66C. The bending parts 66B are formed by bending both ends of this linear part 66A. The concave part 66C is formed between the both end parts of the linear part 66A. Therefore, as shown in FIG. 12, the linear part 66A of the coil 66 of the first coil line 60A is engaged with the concave part 66C of the coil 66 of the second coil line 60B. In addition, the linear part 66A of the coil 66 of the second coil line 60B is engaged with the concave part 66C of the coil 66 of the first coil line 60A. The linear part 66A of the coil 66 of the first coil line 60A and the linear part 66A of the coil 66 of the second coil line 60B are provided so as to overlap each other.

Thus, in the coil part 60, the coils 66 having saddle structures are three-dimensionally combined in 180 degrees different directions. Hence, as the linear motor disclosed in the above-mentioned Japanese Patent Application Publication No. 2001-327152, while a driving force larger than that in a case where flat coils are arranged in the same plan surface can be obtained, there is no space where the heat pipe is inserted between the coil lines.

Since the coils 66 are not connected and therefore decomposed in this state, each of the coils 66 together with its cooling panel 53 is received in the coil receiving part 62 shown in FIG. 4 inside of the resin mold 53.

In the coil part 60, each of the coils 66 is efficiently cooled by the cooling panel 53 attached to the side surface and the heat radiation part attached to the end part, and thereby increase of temperature is prevented. Because of this, in the coil part 60, increase of resistance of each of the coils 66 due to heat is prevented under a simple structure, so that decrease of the thrust force due to heat of the linear motor 20 can be prevented and it is possible to improve the thrust force without the influence of heat. Accordingly, it is possible to achieve a stable torque.

Thus, the cooling panel 53 can directly radiate the heat of the coil part 60 so that the coil part 60 is cooled. Hence, even if a high torque is generated so that the movable stage 18 can move at a high speed, it is possible to achieve sufficient cooling capability to cool the coil 66.

Accordingly, in the linear motor 20, even if the coil has a complex configuration in order to solve the problem of lack of torque, it is possible to efficiently cool from a periphery of the coil 66. Hence, in the linear motor 20, it is possible to realize minute high speed moving control because of the increase of the torque and prevent decrease of a thrust force due to cooling of the coil 66.

In addition, by providing the cooling panel 53 at the side surface of the coil 66, it is possible to prevent heat radiating from the coil 66 so as to reduce thermal influence in the periphery of the coil 66.

Second Example of the Present Invention

Figure 13:
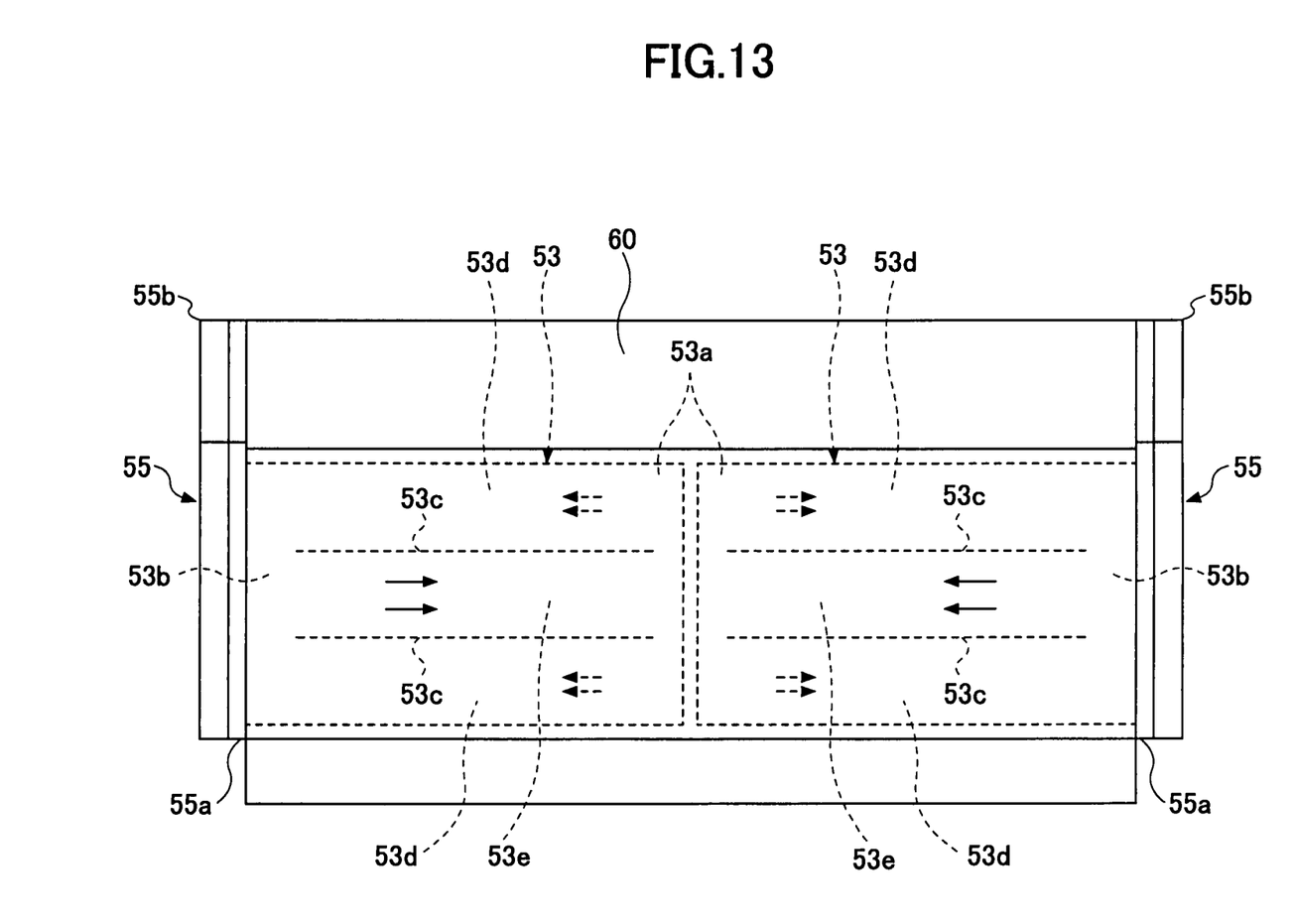
FIG. 13 is a side view of a linear motor of a second example of the present invention.

FIG. 13 is a side view of a linear motor of a second example of the present invention. In FIG. 13, parts that are the same as the parts discussed in the first example of the present invention are given the same reference numerals, and explanation thereof is omitted.

As shown in FIG. 13, in a coil part 60 of the second example of the present invention, a pair of cooling panels 53 is attached to side surfaces in a bilaterally symmetric manner. Therefore, four pieces of the cooling panels 53 are provided at the sides of the coil part 60.

A heat input side 53a of each of four pieces of the cooling panels 53 is provided so as to be positioned in the center of the side surface of the coil part 60. A heat radiation side 53b of each of four pieces of the cooling panels 53 is provided so as to be positioned at an end part of the coil part 60. Heat radiation parts 55 are provided at both ends of the coil part 60. The heat radiation parts 55 are connected to the heat radiation side 53b of each of the cooling panels 53.

Thus, since four pieces of the cooling panels 53 are provided at the sides of the coil part 60, the center part having a highest increase of the temperature of the coil part 60 can be selectively cooled. As a result of this, the cooling panel 53 can be effectively prevent increase of temperature of the coil 66 so that a cooling effect can be improved more that that of the above-discussed first example of the present invention. Thus, plural (four pieces in this example) of the cooling panels 53 can efficiently transfer heat generated due to an applied voltage of the coil 66 from the center part of the coil part 60. Therefore, even if high torque is generated so that the slider 18 can be moved at a high speed, it is possible to obtain a sufficient cooling capability.

Third Example of the Present Invention

Figure 14:
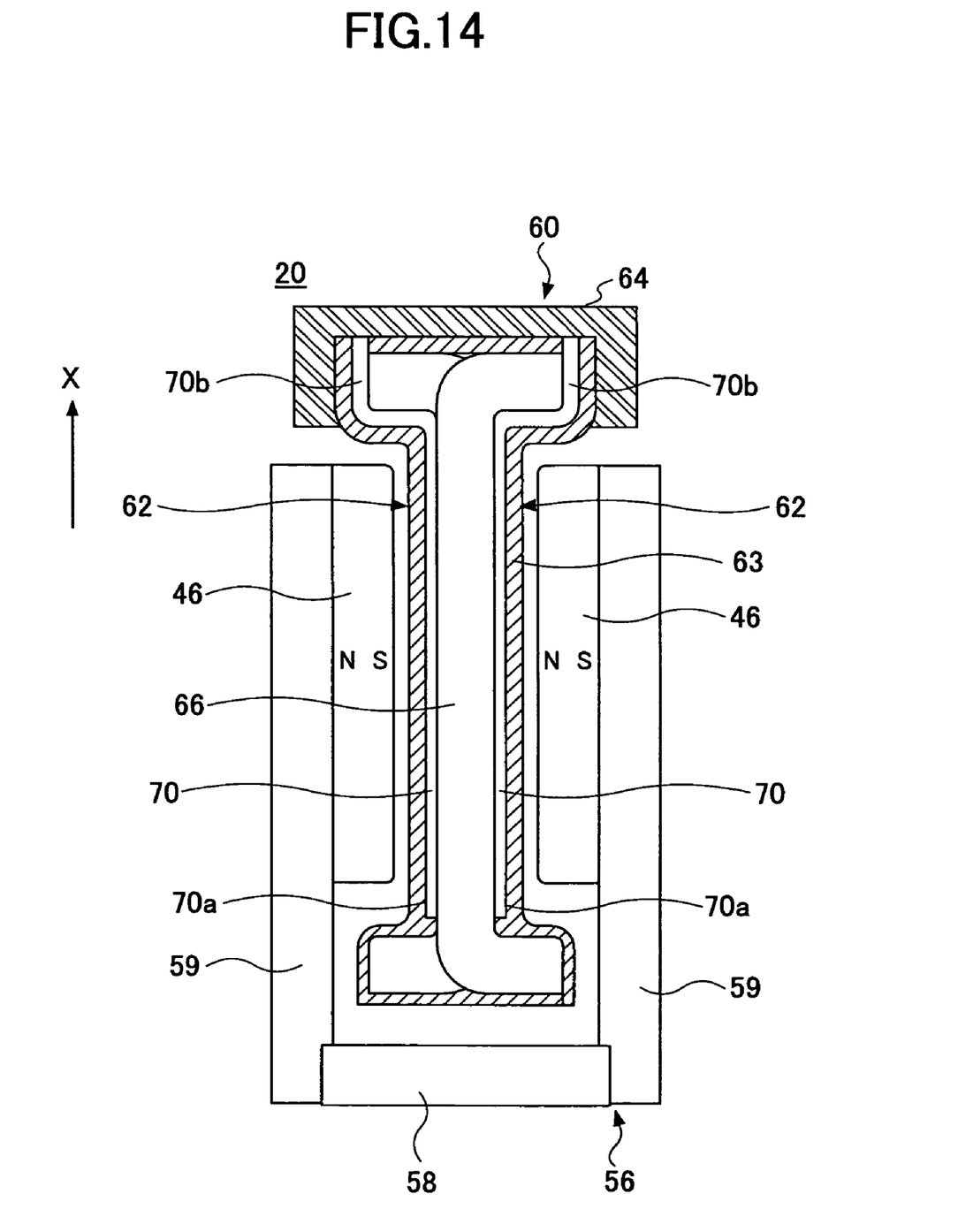
FIG. 14 is a side view of a linear motor of a third example of the present invention.

FIG. 14 is a side view of a linear motor of a third example of the present invention. In FIG. 14, parts that are the same as the parts discussed in the first example of the present invention are given the same reference numerals, and explanation thereof is omitted.

As shown in FIG. 14, in a coil part 60 of the third example of the present invention, cooling panels 70 are provided so as to cool the linear part 66A and the ending part 66B situated at an upper part of the coil 66. A lower part of the cooling panel 70 is a heat input side 70a and an upper part of the cooling panel 70 is a heat radiation part 70b.

Therefore, in the cooling panel 70, a vapor path and reflux path are formed so as to be extended in upper and lower directions. Hence, liquid supplied inside the path is vaporized due to heat from the heat input side situated at the lower part and moves to the heat radiation side 70b situated at the upper part so that vaporization heat of the heat input side 70a is radiated. Since the heat radiation side 70b situated at the upper part is connected to the coil holder 64, the coil holder 64 functions as a heat sink so that the heat radiation side 70b is cooled. Because of this, vapor is returned to liquid by the heat radiation side 70b so that heat is radiated. The liquid aggregated at the heat radiation side 70b is returned to the heat inside side 70a due to capillary action and gravity.

As discussed above, in the third example, unlike the first and second examples of the present invention, it is not necessary to provide the heat sink 55 so that the number of components can be reduced and the heat sink does not project from the end part of the coil part 60.

Thus, as discussed above, according to the embodiments of the present invention, it is possible to provide a linear motor, including a coil part having a plurality of coils forming a coil line; a magnet yoke part having a plurality of permanent magnets facing the coil line; and a coil cooling part configured to cool the coil part; wherein the coil cooling part includes a cooling panel having a heat conductive element, the heat conductive element transferring heat of the coil part to an outside; and a heat radiation part connected to the cooling panel, the heat radiation part being configured to radiate the heat transferred from the heat conductive element to the outside.

In the linear motor, the cooling panel may be provided on a side surface of the coil part so that the heat of the coil part can be transferred to the heat conductive element. The heat radiation part may be provided at an end part of the coil part so as to come in contact with a heat radiation end part of the cooling panel. The coil cooling part may include a plurality of the cooling panels; and a plurality of the heat radiation parts; and heat input sides of the cooling panels are provided so as to come in contact with the center of the coil part. The cooling panel may be formed so that the heat conductive element can come in contact with a side surface of the coil part and a holder part configured to hold the coil part. The heat conductive element may be made of a heat pipe formed in an internal space of the cooling panel. The cooling panel may be provided on the side surface of the coil part so as to come in contact with the heat radiation part for transferring the heat of the coil part to the outside. The cooling panel may include a pair of vapor paths via which vapor moves from a heat input side to a heat radiation side; and a reflux path via which liquid moves from the heat radiation side to the heat input side. The reflux path may include an extra fine wire wick; and reflux speed of the liquid may be accelerated by the extra fine wire wick.

According to the embodiments of the present invention, it is also possible to provide a stage device including a linear motor; a slider driven by the linear motor; a stage configured to move with the slider; and a guide part configured to guide the moving of the stage. The linear motor may include a coil part having a plurality of coil forming a coil line; a magnet yoke part having a plurality of permanent magnets facing the coil line; and a coil cooling part configured to cool the coil part. The coil cooling part may include a cooling panel having a heat conductive element, the heat conductive element transferring heat of the coil part to an outside; and a heat radiation part connected to the cooling panel, the heat radiation part being configured to radiate the heat from the heat conductive element to the outside.

In the stage device, the cooling panel may be provided on a side surface of the coil part so that the heat of the coil part can be transferred to the heat conductive element. The heat radiation part may be provided at an end part of the coil part so as to come in contact with a heat radiation end part of the cooling panel. The coil cooling part may include a plurality of the cooling panels; and a plurality of the heat radiation parts; and heat input sides of the cooling panels are provided so as to come in contact with the center of the coil part. The cooling panel may be formed so that the heat conductive element can come in contact with a side surface of the coil part and a holder part configured to hold the coil part. The heat conductive element may be made of a heat pipe formed in an internal space of the cooling panel. The cooling panel may be provided on the side surface of the coil part so as to come in contact with the heat radiation part for transferring the heat of the coil part to the outside. The cooling panel may include a pair of vapor paths via which vapor moves from a heat input side to a heat radiation side; and a reflux path via which liquid moves from the heat radiation side to the heat input side. The reflux path may include an extra fine wire wick; and reflux speed of the liquid may be accelerated by the extra fine wire wick.

The present invention is not limited to these embodiments, but variations and modifications may be made without departing from the scope of the present invention.

For example, in the above-discussed embodiments, the case where the cooling panels 53 or 70 are formed by the heat pipe is discussed. However, the present invention is not limited to this. The cooling panels 53 or 70 may have a heat conductive element other than the heat pipe as long as it is a panel-shaped cooling part.

In addition, in the above-discussed embodiments, a moving coil type linear motor is discussed. However, the present invention is not limited to this. The present invention may be applied to a moving magnet type linear motor.

Furthermore, in the above-discussed embodiments, a coreless type coil part is discussed. However, the present invention is not limited to this. The present invention may be applied to a coil part having a core.

What is claimed is:

1. A linear motor, comprising:
a coil part having a plurality of coils forming a coil line;
a magnet yoke part having a plurality of permanent magnets facing the coil line; and
a coil cooling part configured to cool the coil part;
wherein the coil cooling part includes
a cooling panel having a heat conductive element, the heat conductive element transferring heat of the coil part to an outside; and
a heat radiation part connected to the cooling panel, the heat radiation part being configured to radiate the heat transferred from the heat conductive element to the outside,
wherein the heat conductive element is made of a heat pipe formed in an internal space of the cooling panel.

2. The linear motor as claimed in claim 1,
wherein the cooling panel is provided on a side surface of the coil part so that the heat of the coil part is transferred to the heat conductive element.

3. The linear motor as claimed in claim 1,
wherein the heat radiation part is provided at an end part of the coil part so as to come in contact with a heat radiation end part of the cooling panel.

4. The linear motor as claimed in claim 1,
wherein the coil cooling part includes
a plurality of the cooling panels; and
a plurality of the heat radiation parts; and
heat input sides of the cooling panels are provided so as to come in contact with the center of the coil part.

5. The linear motor as claimed in claim 1,
wherein the cooling panel is formed so that the heat conductive element comes in contact with a side surface of the coil part and a holder part configured to hold the coil part.

6. The linear motor as claimed in claim 2,
wherein the cooling panel is provided on the side surface of the coil part so as to come in contact with the heat radiation part for transferring the heat of the coil part to the outside.

7. The linear motor as claimed in claim 6,
wherein the cooling panel includes:
a pair of vapor paths via which vapor moves from a heat input side to a heat radiation side; and
a reflux path via which liquid moves from the heat radiation side to the heat input side.

8. The linear motor as claimed in claim 7,
wherein the reflux path includes an extra fine wire wick; and
reflux speed of the liquid is accelerated by the extra fine wire wick.

9. The linear motor as claimed in claim 4,
wherein the cooling panel includes:
a pair of vapor paths via which vapor moves from a heat input side to a heat radiation side; and
a reflux path via which liquid moves from the heat radiation side to the heat input side.

10. A stage device, comprising:
a linear motor;
a slider driven by the linear motor;
a stage configured to move with the slider; and
a guide part configured to guide the moving of the stage;
wherein the linear motor includes
a coil part having a plurality of coil forming a coil line;
a magnet yoke part having a plurality of permanent magnets facing the coil line; and
a coil cooling part configured to cool the coil part; and
wherein the coil cooling part includes
a cooling panel having a heat conductive element, the heat conductive element transferring heat of the coil part to an outside; and
a heat radiation part connected to the cooling panel, the heat radiation part being configured to radiate the heat from the heat conductive element to the outside,
wherein the heat conductive element is made of a heat pipe formed in an internal space of the cooling panel.

11. The stage device as claimed in claim 10,
wherein the cooling panel is provided on a side surface of the coil part so that the heat of the coil part is transferred to the heat conductive element.

12. The stage device as claimed in claim 10,
wherein the heat radiation part is provided at an end part of the coil part so as to come in contact with a heat radiation end part of the cooling panel.

13. The stage device as claimed in claim 10,
wherein the coil cooling part includes
a plurality of the cooling panels; and
a plurality of the heat radiation parts; and
heat input sides of the cooling panels are provided so as to come in contact with the center of the coil part.

14. The stage device as claimed in claim 10,
wherein the cooling panel is formed so that the heat conductive element comes in contact with a side surface of the coil part and a holder part configured to hold the coil part.

15. The stage device as claimed in claim 11,
wherein the cooling panel is provided on the side surface of the coil part so as to come in contact with the heat radiation part for transferring the heat of the coil part to the outside.

16. The stage device as claimed in claim 15,
wherein the cooling panel includes:
a pair of vapor paths via which vapor moves from a heat input side to a heat radiation side; and
a reflux path via which liquid moves from the heat radiation side to the heat input side.

17. The stage device as claimed in claim 16,
wherein the reflux path includes an extra fine wire wick; and
reflux speed of the liquid is accelerated by the extra fine wire wick.

18. The stage device as claimed in claim 13,
wherein the cooling panel includes:
a pair of vapor paths via which vapor moves from a heat input side to a heat radiation side; and
a reflux path via which liquid moves from the heat radiation side to the heat input side.

* * * * *